United States Patent Office 3,584,110
Patented June 8, 1971

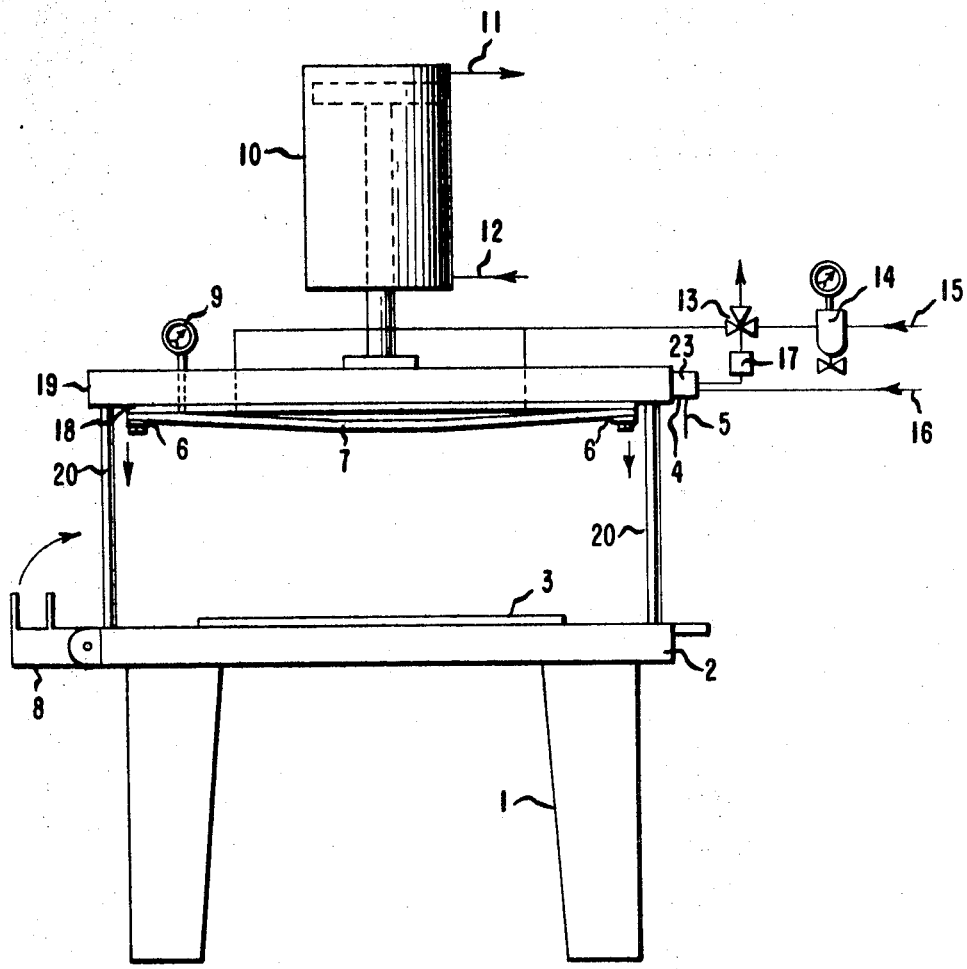

3,584,110
ELECTROMERIC EMBOSSING PROCESS FOR SYNTHETIC MICROPOROUS SHEET MATERIAL
Joseph F. Blaszkow, Madison, and Donald W. Zgleszewski, Hendersonville, Tenn., assignors to E. I. du Pont de Nemours and Company, Wilmington, Del.
Filed Oct. 18, 1968, Ser. No. 768,713
Int. Cl. B29c 1/04; B29d 27/00; B32b 25/10
U.S. Cl. 264—293      10 Claims

ABSTRACT OF THE DISCLOSURE

A process for embossing a panel or shoe upper parts of a synthetic microporous sheet material that has a porous fibrous substrate and is coated on one side with a microporous polymeric layer by (1) placing the microporous layer of the sheet in contact with a heated electroform embossing plate carrying a pattern which can not be properly reproduced upon an embossing roll surface;
(2) applying a uniform low pressure to the porous fibrous side of the sheet using an elastomeric inflated air bladder; and
(3) releasing the pressure and removing the embossed sheet.

BACKGROUND OF THE INVENTION

This invention relates to an embossing process and in particular to a process for embossing a synthetic microporous sheet material.

A variety of methods and processes have been used to emboss plastic sheet materials which are illustrated in Nicholson U.S. 2,135,763, issued Nov. 8, 1938, Chavannes U.S. 2,585,915, issued Feb. 19, 1952 and Reed U.S. 2,838,796, issued June 17, 1958. However, these prior art processes are not applicable for a synthetic microporous sheet material since the temperatures, pressures and equipment used therein damage the microporous coat which causes the sheet material to lose its leather-like characteristics and become stiff and rigid and relatively impermeable to water vapors.

Hochberg U.S. 3,157,723, issued Nov. 17, 1964, is directed toward an apparatus and process for embossing a microporous sheet material. The Hochberg apparatus and process utilizes an embossing roller having a pattern thereon and has been successfully used to emboss microporous sheet materials. However, for many grains, for example, lizard or alligator, an embossing roller cannot be readily formed; also, present techniques for forming embossing rollers result in a roller which has a distinct line where the pattern meets.

The novel process of this invention provides a method for embossing reptile and other grain patterns on a microporous sheet material without collapsing the microporous layer of the material or otherwise adversely affecting the material. The novel process of this invention utilizes an electroform embossing plate which is made by an economical method and provides an exact replica of the grain to be duplicated on the microporous sheet material. Moreover, the novel process of this invention is applicable for embossing panels of microporous material and also for embossing individual shoe upper parts, such as the vamp and the quarter.

SUMMARY OF THE INVENTION

The novel process for embossing a pattern on a panel of a synthetic microporous sheet material that has a porous fibrous substrate that is coated on one side with a microporous synthetic polymeric layer comprises the following steps:

(1) the microporous polymer layer of the sheet material is placed in contact with an electroform embossing plate which is heated to about 200–350° F.;
(2) a uniform low pressure of about 2–30 pounds per square inch gauge (p.s.i.g.) is applied to the porous fibrous substrate side of the microporous sheet material for about 15–180 seconds by using an elastomeric inflated air bladder that is substantially planar and the sheet material is compressed on an average less than 11% of the original thickness of the sheet material, thereby embossing the microporous layer of the sheet with the pattern of the embossing member; and
(3) the pressure is released and the embossed microporous sheet material is removed.

DESCRIPTION OF THE INVENTION

The preferred operating conditions of the process of this invention are to heat the plate to about 315–330° F. and apply a pressure of 18–23 p.s.i. for about 40–80 seconds. The figure which illustrates one preferred machine used in the novel process of this invention will be referred to in the description of the process.

A heated plate 2 is mounted on a frame 1. An embossing plate 3 is positioned on the heating plate 2. The embossing plate may be held to the heated plate 2 by clamps or other mechanical means, but can also be held in place by an electromagnet (not shown) which would be mounted on the frame. An electromagnet is particularly useful if the embossing plate is formed from several thin members positioned above one another which are not mechanically connected.

The upper platen 19 of the machine is attached to the ram cylinder 10 and guided by guides 20. A bladder assembly plate 18 is attached to the upper platen. An elastomeric bladder 7 is positioned on the bladder assembly plate 18 and a retaining flange 6 is positioned over the bladder and is bolted to the assembly plate 18 to form an air tight seal. A bladder pressure gauge 9 is attached to the upper platen 19 which allows monitoring of the pressure within the bladder. Preferably, the elastomeric bladder is of a high temperature resistant fluoro-elastomer coated on a temperature resistant polyamide fabric such as "Viton" coated "Nomex" or a high quality silicone rubber coated fiberglass fabric can be used.

The bladder is pressurized with air which is fed into the bladder by line 15 and the air pressure is controlled by the regulator 14. A three-way solenoid valve 13 allows the air to enter when the valve is activated by the electrical solenoid 17 which is wired to the sensing mechanism 23. Electricity (110 volts) is supplied to the sensing mechanism 23 by line 16.

In the operation of the machine used for the novel process of this invention, a sheet of a microporous material is placed on contact with the embossing plate 3; the microporous polymer layer of the sheet is in contact with the plate. The machine is then activated by conventional means (not shown) and ram cylinder 10 pushes the upper platen 19 into a position which is in close contact with the proximity of the microporous material but not in contact with the microporous sheet material positioned on the embossing plate. The ram cylinder 10 is air activated and has ports 11 and 12. As the upper platen 19 is brought into position, the sensing arm 5 strikes an extended portion of the frame 1. As the sensing arm 5 strikes the frame, the microswitch 4 is activated, which, in turn, activates the solenoid and the solenoid valve 13 allowing air to enter into the space between the bladder 7 and the bladder assembly plate 18. This allows a low uniform and even pressure to be applied over the entire microporous sheet material which gives an excellent embossed microporous layer. When the upper platen 19 is brought into position, the locking jaw 8 swings into position and holds the upper platen in place for the proper length of time.

At the end of the embossing period which is closely controlled, the locking jaw 8 is disengaged and air pressure in the ram cylinder 10 is reversed and the upper platen is brought into its open position. The sensing arm 5 is disengaged from the extended portion of frame 1, the microswitch is deactivated, which causes the solenoid valve 13 to close and prevents additional air from entering the bladder while the air from the bladder is being exhausted. The embossed microporous sheet material is removed.

The heating plate 2 can be heated by a variety of means such as conventional electrical heaters, hot stream or oil, or the microporous sheet material can be heated by using a high frequency electrical heating.

The electroform embossing plate used in the novel process of this invention can be prepared by several methods, for example, the material to be duplicated, e.g., a lizard skin, is made conductive and is electroplated to form a plate. One preferred method is the electroform method in which a negative of the surface to be duplicated in cast from a plastisol and then a positive is prepared from the negative. The positive is then treated and electroplated with copper, the electroplate is removed and mounted on a steel plate to form an embossing plate. Preferably, the embossing plate is electrocoated with nickel to provide durability. One advantage of this process is that a duplicate can be readily made from the original cast.

The microporous sheet material that is embossed by the novel process of this invention can be prepared by a variety of methods. The following patents and applications describe these methods and the discloseure of the same are incorporated herein by reference: Johnston U.S. 3,000,757, issued Aug. 19, 1961; Holden U.S. 3,100,721, issued Aug. 13, 1963; Yuan U.S. 3,190,766, issued June 22, 1965; Holden U.S. 3,208,875, issued Sept. 28, 1965; Brightwell U.S. 3,238,055, issued Mar. 1, 1966 and Patsis 3,364,098, issued Jan. 16, 1968.

The microporous sheet material utilized in the novel process of this invention has a porous fibrous substrate that preferably is impregnated with a polymeric constituent and has a synthetic polymeric microporous top layer.

The porous fibrous substrate is preferably a needled non-woven web. A variety of fibers can be used to prepare the substrate as disclosed in the aforementioned patents but the preferred substrate is of polyester fibers, such as polyethylene terephthalate fibers.

One preferred impregnant for the substrate is a blend of a chain-extended polyurethane polymer up to 50% by weight of a vinyl chloride polymer. One preferred substrate is of a needled non-woven mat of polyethylene terephthalate fibers impregnated with a binder of 50–80% by weight of a chain-extended polyurethane and 20–50% by weight of polyvinyl chloride wherein the binder/fiber ratio of the substrate is about 0.2/1 to about 1/1.

One particularly useful sheet since it has non-roughening characteristics contains an interlayer fabric. The aforementioned U.S. Pat. 3,364,098 to Patsis illustrates microporous sheet materials having an interlayer fabric. A process for making such a product is illustrated in Einstman S.N. 594,122, filed Nov. 14, 1966, now U.S. 3,418,198, issued Dec. 24, 1968; which is hereby incorporated by reference. One preferred microporous sheet material has an interlayer which is a woven web of cotton and polyethylene terephthalate fibers.

The microporous layer of the sheet material is prepared according to Holden Pats. 3,100,721 or 3,208,875 or Yuan 3,190,766. The polymeric constituent of the microporous layer preferably is a chain-extended polyurethane and contains a vinyl chloride constituent. One useful polymer blend contains 60–80% by weight of a chain-extended polyurethane and 10–20% by weight of polyvinyl chloride. The chain-extended polyurethane has a molecular weight of about 5,000–300,000 and is the reaction product of an isocyanate terminated prepolymer and a chain-extender. The isocyanate terminated prepolymer is the reaction product of an aromatic diisocyanate, preferably toluene diisocyanate and/or methylene bis-(4-phenyl isocyanate) and a polyalkyleneether glycol or a hydroxyl terminated polyester. The chain-extender is a compound that has at least two active hydrogen atoms and can be a glycol having 2–10 carbon atoms or a diamine having at least one active hydrogen attached to each nitrogen atom. One preferred chain-extender is hydrazine.

The microporous sheet material embossed by the novel process of this invention has a polymeric finish. In one system that gives a high quality product, a polyurethane layer is first applied and dried, an acrylic layer is then applied over the polyurethane finish. Both of these layers are usually pigmented. A clear cellulose acetate butyrate finish is then applied as a final layer.

A shining material may also be embossed by the novel process of this invention. In this product, a polyester urethane is applied over the microporous layer of the sheet material which is then treated according to the process described in Hochberg U.S. 3,157,723 to give a shining surface. A release sheet, e.g., of a 1–5 mil fluorocarbon polymer film, is positioned between the embossing plate and the microporous sheet material to prevent loss of the shining surface.

The novel process of this invention is illustrated by the following example.

EXAMPLE

A microporous sheet material is prepared according to Example 2 of Einstman, Ser. No. 594,122, filed Nov. 14, 1966, now U.S. Pat. 3,418,198. The resulting sheet material is placed in the machine described in the figure with the microporous layer in contact with the embossing plate. The following embossing conditions are used:

Bladder pressure—19 p.s.i.
Dwell time—1 minute
Embossing plate temperature—325° F.

The sheet material is removed and the resulting product has an excellent design embossed on its surface without loss of the leather-like characteristics of the sheet such as hand and water vapor permeability.

I claim:
1. A process for embossing a pattern which cannot be properly reproduced upon an embossing roll surface on a panel of a synthetic microporous sheet material, said sheet material consists essentially of a porous fibrous substrate coated on one side with a microporous synthetic polymeric layer which comprises:
   (1) placing the microporous polymer layer of said microporous sheet material in contact with an electroform embossing plate having the said pattern thereon and being heated to about 200–350° F.;
   (2) applying a low uniform pressure of about 2–30 p.s.i. to the porous fibrous substrate side of said microporous sheet material by bringing into engagement with the said porous fibrous substrate side an elastomeric inflated air bladder being essentially planar for about 15–180 seconds and compressing said sheet material on an average less than 11% of the original thickness of the sheet material, thereby embossing the synthetic microporous polymeric layer of said sheet material with the pattern of said embossing plate; and

(3) releasing the pressure on said microporous sheet material and removing the embossed microporous sheet material.

2. The process of claim 1 in which the embossing plate is heated to 315–330° F. and a pressure of 18–23 p.s.i. is applied for about 40–80 seconds.

3. The process of claim 2 in which a shoe upper of a microporous sheet material is embossed.

4. The process of claim 2 in which the microporous polymer consists essentially of a polyurethane and the substrate is a non-woven fibrous web of synthetic fibers.

5. The process of claim 2 in which the microporous polymer consists essentially of a blend of at least 50% by weight of a chain-extended polyurethane polymer and up to 50% by weight of a vinyl chloride polymer and in which the porous fibrous substrate consists essentially of a non-woven web of polyethylene terephthalate fibers.

6. The process of claim 2 in which the microporous polymer consists of 60–80% by weight of a chain-extended polyurethane and 40–20% by weight of a polyvinyl chloride, wherein said polyurethane has a molecular weight of 5,000–300,000 and is the reaction product of an isocyanate terminated prepolymer of an aromatic diisocyanate and an active hydrogen containing polymeric material selected from the group consisting of a polyalkyleneether glycol and a hydroxyl terminated polyester which is chain-extended with a compound having at least two active hydrogen atoms selected from the group consisting of a glycol having 2–10 carbon atoms and an amino compound having two amino nitrogen atoms each having at least one hydrogen atom attached thereto;

said porous fibrous substrate being a heat shrunk needled non-woven web of polyethylene terephthalate fibers impregnated with a binder of 50–80% by weight based on the weight of the binder of said chain-extended polyurethane and 20–50% by weight of polyvinyl chloride wherein the binder/fiber ratio of said substrate being about 0.2/1 to about 1/1.

7. The process of claim 6 in which said microporous sheet material contains an interlayer fabric between the microporous polymeric layer and the fibrous substrate of the microporous sheet material.

8. The process of claim 7 in which the polyurethane is a chain-extended polyether urethane of an aromatic diisocyanate polytetramethyleneether glycol and hydrazine and the interlayer is a woven web of cotton and polyethylene terephthalate fibers.

9. The process of claim 8 in which said microporous sheet material has a finish coat which consists essentially of a thin polyurethane coat which is in superposed adherence to siad microporous layer, a thin acrylic polymer layer which is in superposed adherence with said polyurethane layer and a top layer of cellulose acetate butyrate.

10. The process of claim 8 in which said microporous sheet material contains a shining finish coat in superposed adherence to said microporous consists essentially of a polyesterurethane, and a release sheet is positioned between said microporous sheet material and the embossing plate while said low uniform pressure is being applied.

References Cited
UNITED STATES PATENTS

| | | | |
|---|---|---|---|
| 1,986,637 | 1/1935 | L'Hollier | 264—227 |
| 2,422,148 | 6/1947 | Uhlig | 264—119 |
| 3,067,482 | 12/1962 | Hollowell | 264—136 |
| 3,157,723 | 11/1964 | Hochberg | 264—293 |
| 3,190,766 | 6/1965 | Yuan | 264—213 |

ROBERT F. WHITE, Primary Examiner

J. R. THURLOW, Assistant Examiner

U.S. Cl. X.R.

156—219; 264—48, 316, 321, 331